(12) United States Patent
Haine et al.

(10) Patent No.: US 11,662,807 B2
(45) Date of Patent: May 30, 2023

(54) EYE-TRACKING USER INTERFACE FOR VIRTUAL TOOL CONTROL

(71) Applicant: Tectus Corporation, Saratoga, CA (US)

(72) Inventors: Dominic Philip Haine, Saratoga, CA (US); Scott Herz, Saratoga, CA (US)

(73) Assignee: Tectus Corporation, Saratoga, CA (US)

( * ) Notice: Subject to any disclaimer, the term of this patent is extended or adjusted under 35 U.S.C. 154(b) by 78 days.

(21) Appl. No.: 16/940,152

(22) Filed: Jul. 27, 2020

(65) Prior Publication Data

US 2021/0208674 A1 Jul. 8, 2021

Related U.S. Application Data

(60) Provisional application No. 62/957,734, filed on Jan. 6, 2020.

(51) Int. Cl.
*G06F 3/00* (2006.01)
*G06F 3/01* (2006.01)
(Continued)

(52) U.S. Cl.
CPC .............. *G06F 3/013* (2013.01); *G02C 7/04* (2013.01); *G02C 7/083* (2013.01); *G06F 3/012* (2013.01)

(58) Field of Classification Search
CPC .......... G06F 3/013; G06F 3/012; G02C 7/04; G02C 7/083
See application file for complete search history.

(56) References Cited

U.S. PATENT DOCUMENTS

| 4,836,670 | A | * | 6/1989 | Hutchinson | ............ | A61B 3/113 |
| | | | | | | 396/51 |
| 4,973,149 | A | * | 11/1990 | Hutchinson | ............... | A61F 4/00 |
| | | | | | | 351/210 |

(Continued)

FOREIGN PATENT DOCUMENTS

WO 2018109570 6/2018

OTHER PUBLICATIONS

Vidal, M., Nguyen, D. H., & Lyons, K. (Sep. 2014). Looking at or through? using eye tracking to infer attention location for wearable transparent displays. In Proceedings of the 2014 ACM International Symposium on Wearable Computers (pp. 87-90).*

(Continued)

*Primary Examiner* — Sarah Lhymn
(74) *Attorney, Agent, or Firm* — North Weber & Baugh LLP; Michael North

(57) ABSTRACT

The present disclosure relates generally to eye-tracking systems and methods that provide a user the ability to efficiently activate the system and select and dismiss virtual objects within an augmented reality ("AR") and/or virtual reality ("VR") environment. A user may activate the user interface by glancing beyond an activation threshold positioned close enough to the edge of the field of view to reliably infer an intent to activate the virtual controls. Subsequently, the user interacts with virtual tools, first virtual "peek" windows and secondary virtual windows to obtain content or virtual control across a variety of granular levels. Subsequently, the user may glance away at virtual content or to other predefined areas within their eye's range of motion to dismiss the tool and/or deactivate the system.

12 Claims, 19 Drawing Sheets

(51) Int. Cl.
*G02C 7/08* (2006.01)
*G02C 7/04* (2006.01)

(56) References Cited

U.S. PATENT DOCUMENTS

| | | | |
|---|---|---|---|
| 5,844,544 | A | 12/1998 | Kahn |
| 6,152,563 | A * | 11/2000 | Hutchinson ............. G06F 3/013 |
| | | | 351/209 |
| 8,430,310 | B1 | 4/2013 | Ho |
| 8,520,309 | B2 | 8/2013 | Sprague |
| 8,764,185 | B1 | 7/2014 | Biederman |
| 8,786,675 | B2 | 7/2014 | Deering |
| 8,798,332 | B2 | 8/2014 | Otis |
| 8,827,445 | B1 | 9/2014 | Wiser |
| 8,870,370 | B1 | 10/2014 | Otis |
| 8,874,182 | B2 | 10/2014 | Etzkorn |
| 8,960,898 | B1 | 2/2015 | Etzkorn |
| 8,964,298 | B2 | 2/2015 | Haddick |
| 8,971,978 | B2 | 3/2015 | Ho |
| 8,989,834 | B2 | 3/2015 | Ho |
| 9,028,068 | B2 | 5/2015 | Chang |
| 9,047,512 | B2 | 6/2015 | Otis |
| 9,052,533 | B2 | 6/2015 | Pugh |
| 9,153,074 | B2 | 10/2015 | Zhou |
| 9,170,646 | B2 | 10/2015 | Toner |
| 9,196,094 | B2 | 11/2015 | Ur |
| 9,215,293 | B2 | 12/2015 | Miller |
| 9,298,002 | B2 | 3/2016 | Border |
| 9,298,020 | B1 | 3/2016 | Etzkorn |
| 9,341,843 | B2 | 5/2016 | Border |
| 10,345,621 | B2 | 7/2019 | Franklin |
| 10,353,463 | B2 | 7/2019 | Shtukater |
| 2009/0066722 | A1 | 3/2009 | Kriger |
| 2011/0221659 | A1 | 9/2011 | King, III |
| 2012/0194781 | A1* | 8/2012 | Agurok ................. A61B 3/113 |
| | | | 351/201 |
| 2014/0063054 | A1 | 3/2014 | Osterhout |
| 2014/0098226 | A1 | 4/2014 | Pletcher |
| 2014/0198128 | A1 | 7/2014 | Hong |
| 2014/0347265 | A1 | 11/2014 | Aimone |
| 2015/0192992 | A1 | 7/2015 | Di Censo |
| 2015/0205106 | A1 | 7/2015 | Norden |
| 2015/0235439 | A1 | 8/2015 | Schowengerdt |
| 2015/0235440 | A1 | 8/2015 | Schowengerdt |
| 2015/0235444 | A1 | 8/2015 | Schowengerdt |
| 2015/0235446 | A1 | 8/2015 | Schowengerdt |
| 2015/0235457 | A1 | 8/2015 | Schowengerdt |
| 2015/0235468 | A1 | 8/2015 | Schowengerdt |
| 2015/0235471 | A1 | 8/2015 | Schowengerdt |
| 2015/0241698 | A1 | 8/2015 | Schowengerdt |
| 2015/0243090 | A1 | 8/2015 | Schowengerdt |
| 2015/0338915 | A1* | 11/2015 | Publicover ............ G06F 21/316 |
| | | | 345/633 |
| 2015/0339857 | A1 | 11/2015 | O'Connor |
| 2015/0362753 | A1 | 12/2015 | Pletcher |
| 2016/0011419 | A1 | 1/2016 | Gao |
| 2016/0018650 | A1 | 1/2016 | Haddick |
| 2016/0018651 | A1 | 1/2016 | Haddick |
| 2016/0018652 | A1 | 1/2016 | Haddick |
| 2016/0018653 | A1 | 1/2016 | Haddick |
| 2016/0025981 | A1 | 1/2016 | Burns |
| 2016/0029883 | A1* | 2/2016 | Cox .................... G06K 9/00604 |
| | | | 351/209 |
| 2016/0091737 | A1 | 3/2016 | Kim |
| 2016/0133201 | A1 | 5/2016 | Border |
| 2016/0253831 | A1 | 9/2016 | Schwarz |
| 2016/0274660 | A1 | 9/2016 | Publicover |
| 2016/0283595 | A1 | 9/2016 | Folkens |
| 2017/0019661 | A1 | 1/2017 | Deering |
| 2017/0023801 | A1* | 1/2017 | Hyde .................... A61F 2/1624 |
| 2017/0115742 | A1 | 4/2017 | Xing |
| 2017/0123492 | A1 | 5/2017 | Marggraff |
| 2017/0169602 | A1* | 6/2017 | Blackmon ............... G06T 15/06 |
| 2017/0177078 | A1 | 6/2017 | Henderek |
| 2017/0270636 | A1 | 9/2017 | Shtukater |
| 2017/0285735 | A1* | 10/2017 | Young ..................... G06F 3/013 |
| 2017/0287112 | A1* | 10/2017 | Stafford ................. G06F 3/013 |
| 2017/0287446 | A1* | 10/2017 | Young ..................... G06F 3/013 |
| 2017/0371184 | A1 | 12/2017 | Shtukater |
| 2018/0049683 | A1* | 2/2018 | Cote ..................... A61B 5/14558 |
| 2018/0059780 | A1* | 3/2018 | Mitchell ................. A63F 13/52 |
| 2018/0061116 | A1* | 3/2018 | Mitchell ................. G06F 3/012 |
| 2018/0120568 | A1 | 5/2018 | Miller |
| 2018/0149884 | A1 | 5/2018 | Miller |
| 2018/0173011 | A1* | 6/2018 | Barrows ................. G02C 7/083 |
| 2018/0279877 | A1* | 10/2018 | Berdahl ................. A61B 3/102 |
| 2018/0284451 | A1* | 10/2018 | Eash ...................... G06F 3/016 |
| 2018/0335835 | A1 | 11/2018 | Lemoff |
| 2018/0348969 | A1 | 12/2018 | Kawamura |
| 2018/0350119 | A1* | 12/2018 | Kocharlakota ....... G06F 3/0482 |
| 2019/0056785 | A1 | 2/2019 | Suk |
| 2019/0250408 | A1 | 8/2019 | Lafon |
| 2019/0250432 | A1 | 8/2019 | Kim |
| 2019/0274543 | A1* | 9/2019 | van der Steen ...... A61B 5/1127 |
| 2019/0346931 | A1* | 11/2019 | Wu ..................... G06K 9/00335 |
| 2019/0354173 | A1* | 11/2019 | Young ..................... G06F 3/012 |
| 2019/0354174 | A1* | 11/2019 | Young ..................... G06N 5/046 |
| 2019/0354334 | A1* | 11/2019 | Billinghurst .......... A61B 3/113 |
| 2019/0377428 | A1 | 12/2019 | Mirjalili |
| 2021/0174768 | A1* | 6/2021 | Jarven ..................... G06F 3/012 |

OTHER PUBLICATIONS

Sidenmark, L., Mardanbegi, D., Gomez, A. R., Clarke, C., & Gellersen, H. (Jun. 2020). Bimodalgaze: Seamlessly refined pointing with gaze and filtered gestural head movement. In ACM Symposium on Eye Tracking Research and Applications (pp. 1-9).*

Sidenmark, L., & Gellersen, H. (Oct. 2019). Eye&head: Synergetic eye and head movement for gaze pointing and selection. In Proceedings of the 32nd annual ACM symposium on user interface software and technology (pp. 1161-1174).*

Doshi, A., & Trivedi, M. M. (2012). Head and eye gaze dynamics during visual attention shifts in complex environments. Journal of vision, 12(2), 9-9.*

International Search Report and Written Opinion in PCT/US2020/056376, dated Jan. 12, 2021, 10 pages.

* cited by examiner

EYE-TRACKING USER INTERFACE FOR VIRTUAL TOOL CONTROL

This patent application is related to and claims priority benefit under 35 U.S.C. § 119(e) to commonly-owned U.S. Provisional Patent Application No. 62/957,734, entitled "EYE-GESTURE USER INTERFACE," naming as inventor Dominic Philip Haine and Scott Herz, and filed Jan. 6, 2020, which patent document is incorporated by reference herein in its entirety and for all purposes.

TECHNICAL FIELD

The present disclosure relates generally to eye-tracking systems and methods that provide a user the ability to efficiently activate, select and dismiss virtual objects within an augmented reality ("AR") and/or virtual reality ("VR") environment.

BACKGROUND

The growth of AR/VR technologies across a large and diverse set of markets is well understood by one of skill in the art. Markets such as gaming, media, search, and information management implement a variety of different AR/VR products to allow an individual to interact with a virtual environment. These AR/VR products provide an individual a rich and dynamic platform in which the user can retrieve information, view media content, navigate virtual scenes and interact with other individuals in a manner unique to the AR/VR environment. It is important that these AR/VR products maintain a user-friendly experience throughout their use and avoid overloading a user with too much content and information, while concurrently managing the way in which the user interacts with the virtual environment; a task that is oftentimes difficult given the constraints of today's AR/VR products.

While AR/VR technologies offer users the ability to uniquely interact with virtual content in a virtual medium and enjoy an immersive user experience, these technologies are not without limitations. These technologies are oftentimes constrained by the way an individual can interact with the virtual environment. For example, many AR/VR products rely on hand-gestures, hand controllers, or other types of movement that must be translated into the virtual environment itself. These interactive movements are potentially obtrusive, hard to learn, tiring over time, inconvenient to use, and not available to those without facile motion of their arms or hands. Further, such movements may appear awkward in a social context, thus, negatively impacting the overall virtual experience. Furthermore, some virtual environments, such as AR glasses, are oftentimes area-limited in that the viewable area within the virtual environment is significantly constrained to only a portion of the user's field of view. This limited viewable area may significantly limit a product's ability to provide an individual a diverse set of content, information, and options within this visible area of a virtual scene. These issues become more complicated as the amount of information potentially provided to a user becomes large and diverse. In prior art systems, a user's ability to activate, select and dismiss tools within a virtual environment are oftentimes burdensome, inefficient, and/or unorganized.

Accordingly, what is needed is systems and methods that allow a user to more efficiently interact with a variety of virtual objects, including tools and windows within an AR/VR environment.

BRIEF DESCRIPTION OF THE DRAWINGS

Figure ("FIG.") 1A illustrates an exemplary eye-mounted display ("EMD") system according to embodiments of the present disclosure.

DETAILED DESCRIPTION OF EMBODIMENTS

The figures and the following description relate to various embodiments by way of illustration. It is noted that from the following discussion, alternative embodiments of the structures and methods disclosed herein will be readily recognized as viable. It is further noted that any headings used herein are only for organizational purposes and shall not be used to limit the scope of the description or the claims. All documents cited are incorporated by reference herein in their entirety.

A. Eye Mounted Display System

Figure 1A:
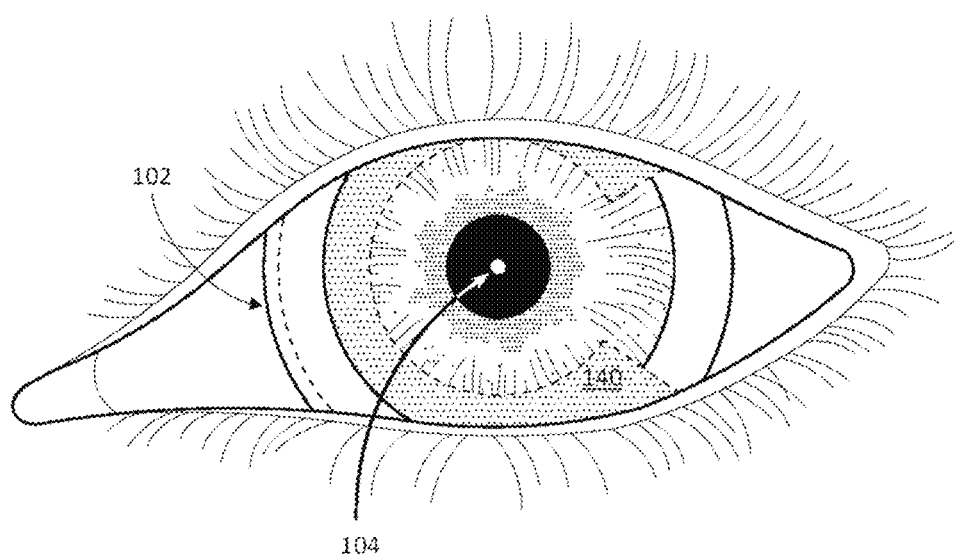
FIG. 1B illustrates an exemplary contact lens component for an EMD system according to embodiments of the present disclosure.
Figure 1B:
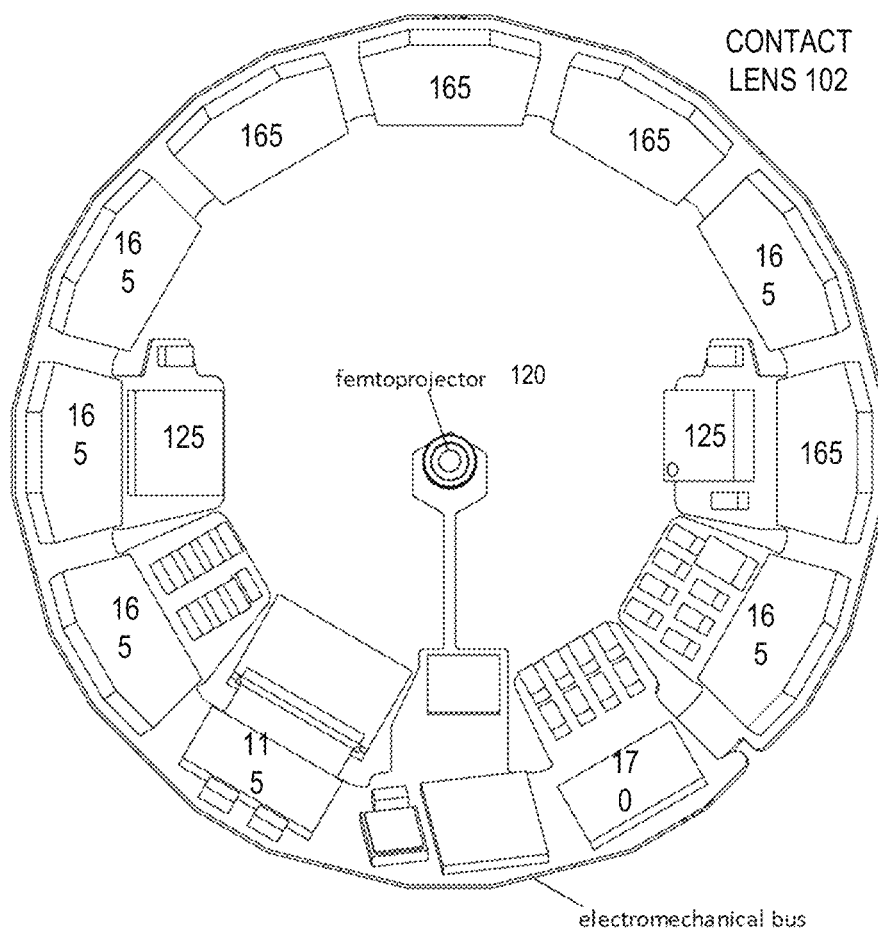

FIGS. 1A and 1B illustrate an exemplary eye-mounted display ("EMD") system according to embodiments of the present disclosure. The EMD system 102 allows a user to interact with virtual objects, including virtual tools and windows, using eye movement that is translated into a virtual scene. The EMD system 102 may comprise a contact lens 140, such as a scleral contact lens designed to be fixed on the wearer's eyeball. Embedded on the contact lens 140 may be a display 104, sensors, power components, communications devices, control systems, and other components that provide various functions within the system. The display 104 may be implemented as a miniature video projector that projects images on the part of the wearer's retina centered on the fovea; the highly sensitive and high-resolution region of the retina that is referred to when the eye directly gazes or inspects an object. The display 104 is defined as a femtoprojector 120 within FIG. 1B, which is described within certain US applications and patents identified below.

Sensors may comprise any type of motion sensors 125, such as accelerometers, magnetometers, and gyroscopes, and image sensors (such as a camera) that may be used for eye-tracking functionality. The power, communications, and control systems comprise coils that enable inductive power transfer, or an energy storage device, such as a battery 165, that can deliver sufficient energy to operate EMD system 102 for a period of time. A power circuit 170 may also be provided that regulates and controls power to the various devices on the system. Various EMD systems may also include transceivers 115 for communication with internal and/or external devices, and various controllers that control circuits and sub-circuits.

The user of an eye controlled EMD system 102 may use any combination of eye movements and other signals to interact with a virtual scene. This interaction may be supplemented with various auxiliary devices such a head-mounted head-tracking device, a smartphone, a hand-held controller, other body sensors, electronic jewelry or any other type of device that can communicate with the EMD system.

It is noted that certain tasks performed by EMD system 102 may equally be performed, for example, by an accessory device (not shown in FIG. 1) that may be communicatively coupled with EMD system 102 and, in embodiments, provides power via inductive coupling. Exemplary accessory devices, EMDs, and their functions and components are described in greater detail in U.S. patent application Ser. No. 15/959,169, filed on Apr. 21, 2018, entitled "Power Generation Necklaces that Mitigate Energy Absorption in the Human Body," listing inventors Miller et al.; U.S. patent application Ser. No. 15/966,481, filed on Apr. 30, 2018, entitled "Multi-Coil Field Generation In An Electronic Contact Lens System," listing inventors Owens et al.; U.S. patent application Ser. No. 15/966,475, filed on Apr. 30, 2018, entitled "Multi-Coil Field Generation In An Electronic Contact Lens System," listing inventors Owens et al.; U.S. patent application Ser. No. 15/984,182, filed on May 18, 2018, entitled "Power Generation Necklaces that Reduce Energy Absorption in the Human Body," listing inventors Owens et al.; U.S. patent application Ser. No. 16/035,640, filed on Jul. 15, 2018, entitled "Eye-mounted Displays Including Embedded Conductive Coils," listing inventors Mirjalili et al.; and U.S. patent application Ser. No. 16/227,139, filed on Dec. 20, 2018, entitled "Eye-Mounted Display System Including A Head Wearable Object," listing inventors Pang et al., which patent documents are incorporated by reference herein in their entirety and for all purposes.

In embodiments, EMD system 102 manages how, where, and when virtual objects, such as virtual tools, peek windows and virtual windows in a virtual scene are activated, selected, displayed and dismissed within a given coordinate space. The EMD system 102 controls the content and layout of a virtual scene including the graphical representation of the virtual objects on the display according to user's eye-movement. This control allows a user to efficiently interact with virtual objects to activate, select and dismiss tools and windows in an organized and structured manner within the virtual scene.

In embodiments, eye-movements may be tracked, estimated (e.g., using a Kalman filter algorithm) and/or predicted based on motion, image, sensor data or a combination thereof. Data derived from such eye movements may include timing and sequences of saccadic movements, eye direction (e.g., eye angle, elevation, roll, yaw), the fixation point in space, orientation of head/body, and body position data. This data may also consider wearer-specific conditions, such as physical and biological characteristics, that relate to the user's range of eye-motion, eye muscle irregularities, and other limiting factors and context that may vary over time.

B. Sensors

As stated above, the EMD system may have sensors used to sense eye movements to determine distance, speed, acceleration, orientation, path, angle, rate, etc. Various types of sensors and their strategic locations on contact lens are described in more detail in in U.S. patent application Ser. No. 16/005,379, filed on Jun. 11, 2018, entitled "Contact lens gaze tracking architectures," listing inventors Mirjalili et al. and U.S. patent application Ser. No. 16/200,039, filed on Nov. 26, 2018, entitled "Eye-mounted Displays Including Embedded Solenoids," listing inventors Mirjalili et al., which patent documents are incorporated by reference herein in their entirety and for all purposes.

In embodiments, raw sensor data from the sensors may be translated into control signals that use information related to eye movement. This eye movement tracking identifies an initial orientation of the eye to track or predict a target or intermediate location therefrom. The detected or predicted eye movements, in turn, may be used to control, activate, dismiss, navigate, or select virtual objects in a virtual scene. This type of interaction between a user and a virtual scene allows for a smooth, intuitive, and effortless manner in which a user can navigate a scene and extract information therefrom.

Figure 2A:
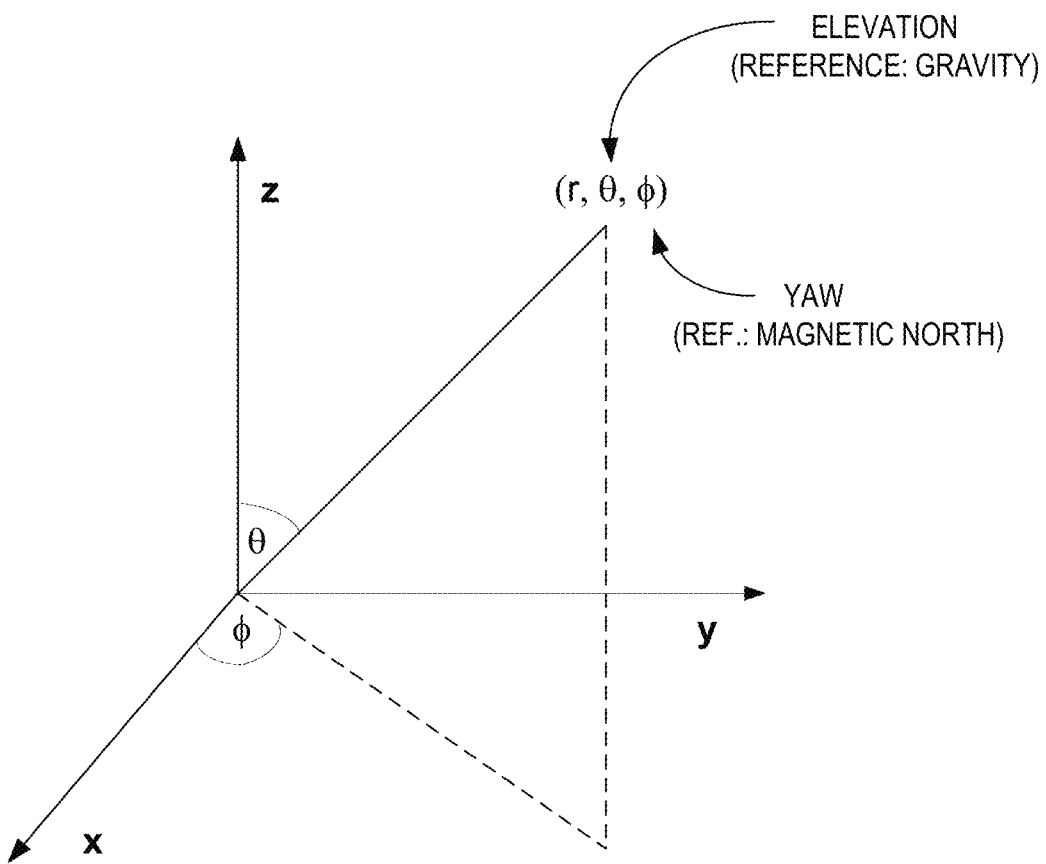
FIG. 2A show a polar coordinate system that serves as an exemplary reference frame for components in the EMD system shown in FIGS. 1A and 1B.

FIG. 2A shows a spherical coordinate system that may serve as a reference frame for components in the EMD system shown in FIGS. 1A and 1B. As shown in the figure, the reference for an elevation sensor, such as an accelerometer, may be the polar angle $\theta$ that is directed along the earth's gravitational field. The reference for a yaw sensor, such as a magnetometer, may be the magnetic north pole and may be tracked using an azimuthal angle $\phi$. It is understood that a reference frame may be defined in any arbitrary convention, including a two-dimensional polar coordinate system, a cylindrical coordinate system, or any other system known in the art.

Figure 2B:
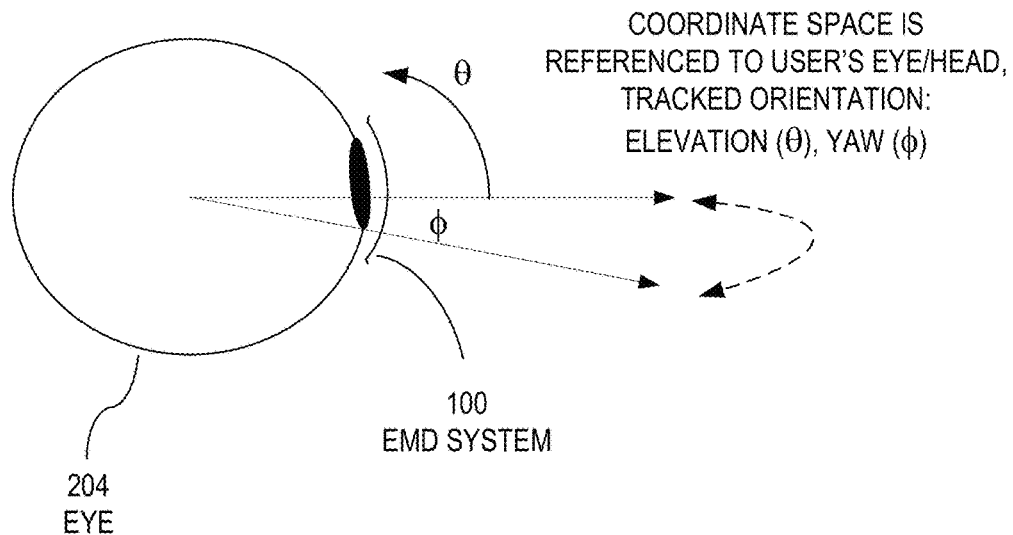
FIG. 2B and FIG. 2C illustrate various conventions for reference frames for the EMD system shown in FIGS. 1A and 1B.
Figure 2C:
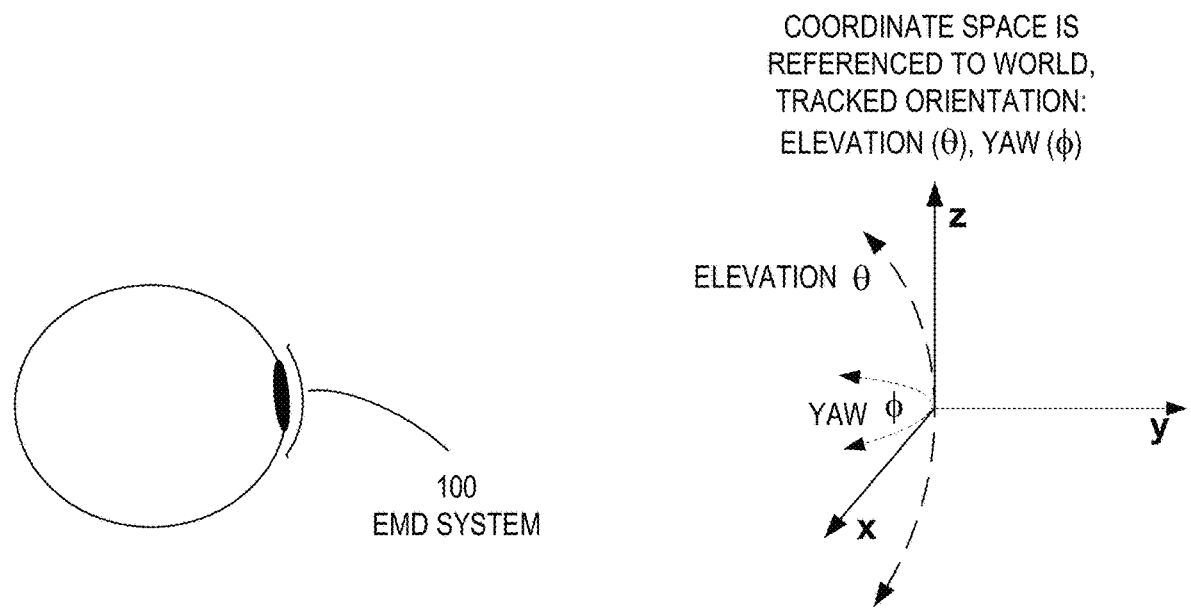

FIG. 2B and FIG. 2C illustrate various conventions for reference frames for the EMD system shown in FIGS. 1A and 1B. FIG. 2B refers to the coordinate space of the user's eye 204 or head to enable eye-tracking or head-tracking by tracking polar angle $\theta$ (i.e., up/down elevation) and azimuthal angle φ (i.e., left/right rotation). FIG. 2C refers to the coordinate space of the user's environment to enable "world-tracking," by tracking angles θ and φ, representing elevation and yaw, respectively. In a world-tracked system, objects in the virtual environment appear locked at locations in the user's environment, irrespective of how the user moves his/her eyes, head or body. Head movement may be tracked in a variety of ways including mounted sensors on a device positioned on the head, using sensors within the EMD that measure electrical values or inferring head motion based on known correlations of eye movement characteristics relative to typical head movement.

In embodiments, mathematical transformations may be utilized to facilitate transitions between reference frames, coordinates, and parameters to enable smooth transitions at suitable rates when a user visually navigates and interacts with virtual objects in the coordinate space of a virtual scene. A transition may involve switching from a reference frame to which the user's eyes or head are fixed to one where it is the user's body that is fixed. For example, a first frame of reference, e.g., for the user's head, may be derived from a second frame of reference for the user's eyes by taking into account the orientation of the user's eyes and the manner in which the user's head follows the user's eyes. In addition, a transition may involve transitioning between various reference frames that are associated with different objects in a virtual scene, e.g., objects that are fixed to different reference frames. Tracking a user's head motion at or around the same time may further provide an indication of the user glance attempting to activate, select or dismiss a virtual object. For example, if a user's head has little or no motion during a glance to the periphery, then this combination of head movement and eye movement may be interpreted as an intent to interact with a virtual object in a particular way because this type of movement is less common during normal activity by a user.

C. Concept of Span of Eccentricity

Figure 3:
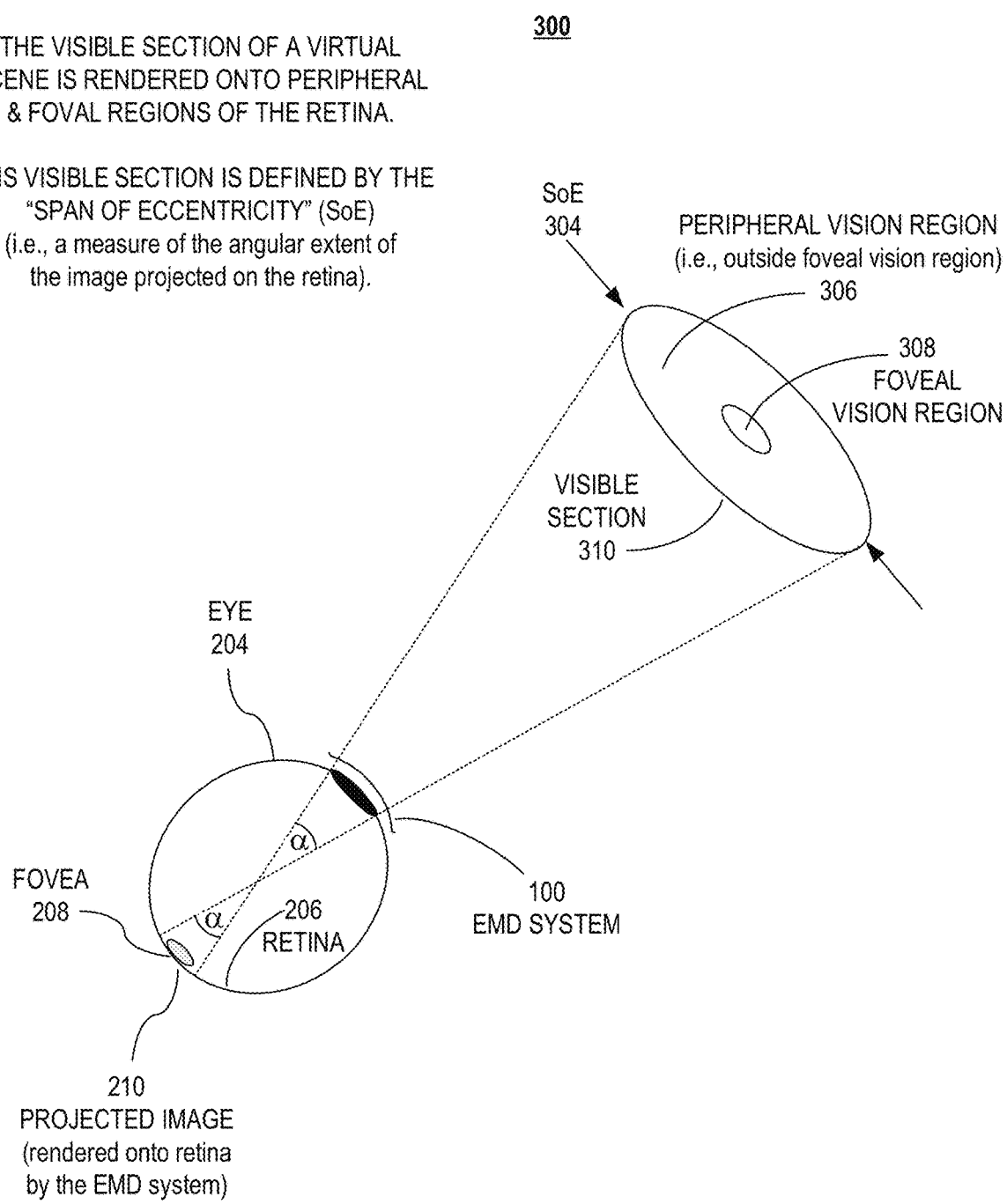
FIG. 3 illustrates the concept of Span of Eccentricity (SoE) according to embodiments of the present disclosure.

FIG. 3 illustrates the concept of Span of Eccentricity (hereinafter, "SoE") according to embodiments of the present disclosure. In this document, the term "projected" is used interchangeably with the terms "displayed." Similarly, the term "user" is used interchangeably with the term "wearer." "Span of Eccentricity" refers to the apparent angular width of the projected image 210 centered on the line of gaze, extending into the peripheral vision. As depicted in FIG. 3, the projected image 210 is the visible section of a virtual scene, such as that depicted in FIG. 4B. In embodiments, looking outward from eye 204, the image 210 that is projected onto retina 206 by EMD 102 appears to have an angular width in the outside world equal to that of the SoE 304.

In embodiments, because EMD system 102 is fixed on eyeball 204, the image 210 projected by EMD 102 is ordinarily fixed (i.e., locked) to and moves together with eyeball 204. As a result, the wearer sees projected image 210 displayed on retina 206 irrespective of where wearer of EMD 102 directs his/her eye 204 (or any other body parts). In fact, because the projector is aimed to at the center of the wearer's retina the wearer of EMD 102 cannot even look at or fixate eye 204 anywhere other than about the center of SoE 304; specifically, the foveal vision region 308 (the fovea extends from zero to about 1.5° eccentricity about 3° within the SoE). Thus, irrespective of where eye 204 moves, the wearer cannot look at or inspect objects or images appearing outside of foveal vision region 308 at the edges of SoE 304 as those images remain only in the wearer's peripheral vision region 306. Stated differently, while the wearer of EMD 102 may recognize that a virtual object is present at the edge of projected image 210, without additional capability, the wearer is unable to direct his/her gaze there. Because eye movements bring the contact lens projector with it, they alone do not change the content and location of what is projected on the wearer's retina 206, the attempt is rendered futile.

A person of skilled in the art will appreciate that the concept of SoE is markedly different from, and not to be confused with, the concept of "field of view" as used in connection with conventional displays, such as computer monitors, TVs, or displays on eyeglasses (i.e., the angular separation between the edges of a display). For instance, if a user has to move his/her eyes by an angle of 50 degrees from one edge of a conventional display to the opposite edge, the field of view is said to be 50 degrees wide.

In contrast to a traditional display, a canvas that has a fixed width and height that define the user's field of view, the entire world around the user's head/eyes is the virtual canvas even if the image displayed on retina 206, and seen at any moment in time when eye 204 does not move, corresponds to the portion of the canvas that is covered by SoE 304. The virtual canvas is practically unlimited in that moving SoE 304, i.e., the visible portion, allows the user to view a virtual scene in all directions, i.e., 360 degrees around the user, with no boundaries and without a "field of view" limitation. Similarly, in an AR system, the visible area is the same as the field of view of the display area. Despite the limited field of view, a user can look around a larger virtual scene in an AR system by turning the head. Comparatively, a user's field of view, when one does not move one's head, is limited by the range of eye motion.

As discussed in greater detail below, to enable direct inspection of objects in a virtual scene with highly sensitive fovea 208 that are located outside of foveal region 308 or outside SoE 304, the projected image 210 is updated to appear to move SoE 304 to the new location within the virtual scene. The updated image is correlated to the movement of the eye 204 and EMD 102 to render the appropriate segment of the virtual scene to the user. For example, if a movement of eye 204 in one direction occurs, the projected image 210 may be updated in an opposite direction such as to give the user a perception of scanning the virtual scene.

Overall, unlike for conventional displays, such as monitors, phone screens, AR glasses/goggles, or other types of displays in the pertinent art, the wearer of a contact lens comprising EMD 102 does not perceive images generated by the image projector and displayed within SoE 304 as being in a "field of view."

Figure 4A:
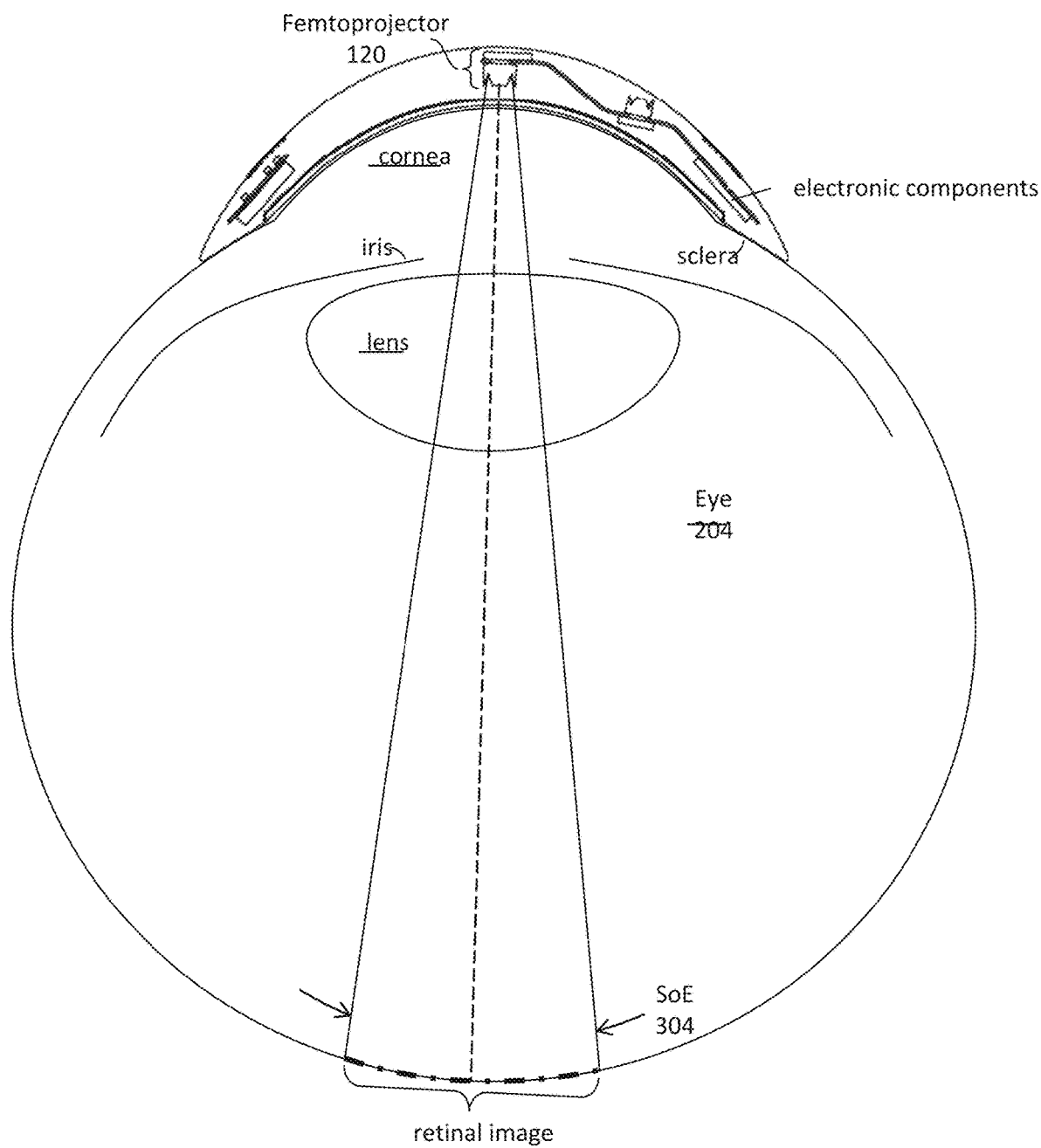
FIG. 4A illustrates projecting onto the retina the visible portion of a virtual image according to embodiments of the present disclosure.

FIG. 4A illustrates projecting onto the retina the visible portion of a virtual image according to embodiments of the present disclosure. An EMD system comprises a femtoprojector 120 that may be embedded with a contact lens. In embodiments, femtoprojector 120 may be implemented as a miniature video projector that comprises an image source (e.g., a micro-display frontplane comprising a light emitting diode array) and a micro-optical projection system that projects an image generated by the image source directly onto retina to cause the image to appear in the user's field of vision. An eye-mounted display including a femtoprojector was first proposed by Deering. See, e.g. U.S. Pat. No. 8,786,675, "Systems using eye mounted displays." One type of eye-mounted display is based on a tiny projector mounted inside a contact lens. The projector projects images onto the retina of a person wearing the contact lens. The projector must be sufficiently small (e.g., a 2 mm by 2 mm by 2 mm by cubic volume) to fit inside or on a contact lens that can be worn on a person's eyeball, such that, for convenience, Deering called it a "femtoprojector." A typical femtoprojector preferably is no larger than about one or two millimeters in any dimension. In embodiments, the femtoprojector's optical system may be implemented using a cylindrical, solid plastic, dual-mirror design. While being constrained to the physical dimensions of a contact lens, the optical system should provide appropriate magnification and sufficient image quality.

It is noted that EMD system may be used in VR applications, AR applications, mixed reality applications, and the like. In virtual reality applications, the image projected by EMD system replaces what the user would normally see in the external environment, whereas in AR and mixed reality applications, the projected images appear superimposed onto the external environment, such that the projected image augments or adds to what the user sees in the real world.

D. Flashlight Comparison

Figure 4B:
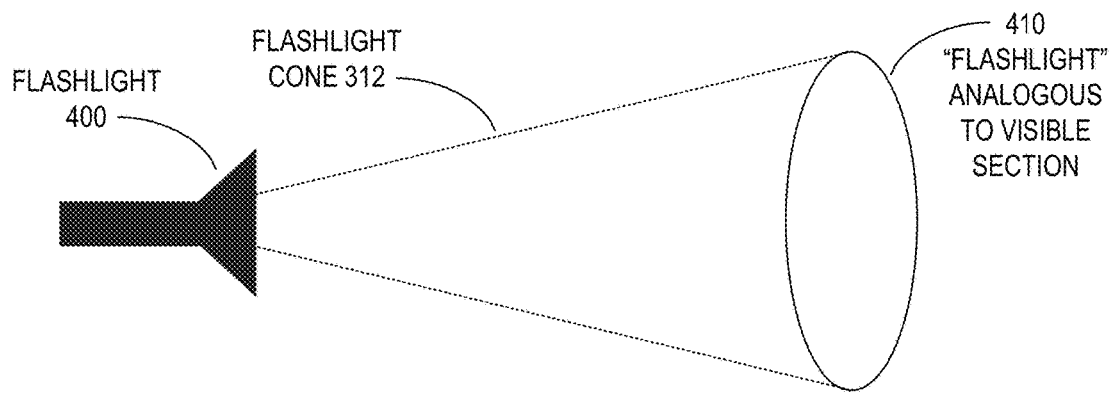
FIG. 4B and FIG. 4C illustrate the concept of SoE using a flashlight analogy.
Figure 4C:
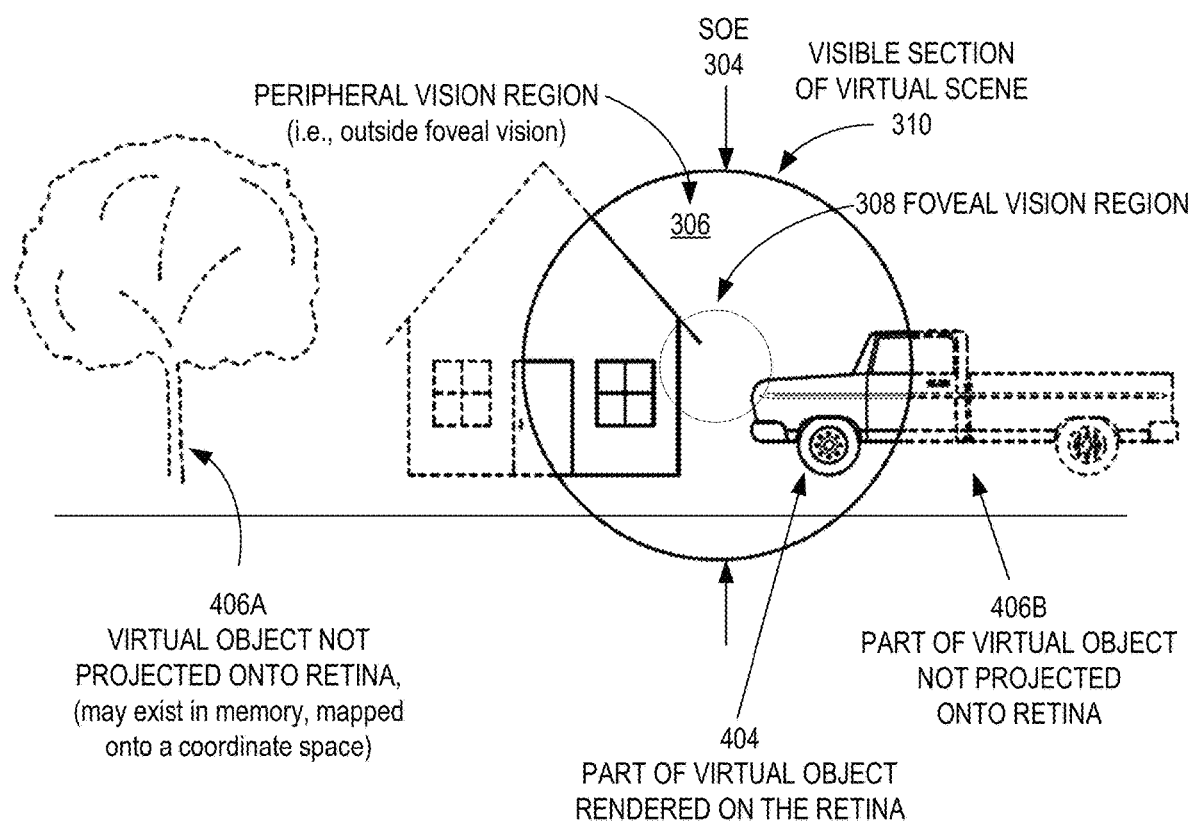

FIG. 4B and FIG. 4C illustrate the concept of SoE by using a flashlight analogy. In certain aspects, the notion of an SoE making visible just a section of the larger virtual scene is analogous to looking at objects in a dark environment (FIG. 4C) illuminated only by a flashlight (FIG. 4B). In both cases, only the portion of the 2D or 3D scene that is "illuminated" by SoE 304 or the conical beam 312 of the flashlight is visible at a given moment. This analogy assumes that a defined circular edge exists around the circumference of the projected flashlight that effectively limits the visible region within the circumference of the flashlight relative to a virtual scene.

Depicted in FIG. 4C is a virtual scene that comprises visible section 310 and invisible sections of virtual scene 406 defined by what is displayed within the SoE 304 at any moment in time. The image displayed in visible section 310 has a circular shape, similar to the projection produced by flashlight 400. As the visibility of items illuminated by shining a flashlight onto them is confined to the illuminated surfaces, an EMD image projector projects images onto a limited (here, circular) visible section 310 corresponding to, for example, a 25-degrees-wide SoE 304. Therefore, as shown in FIG. 4C, visible section 310, which comprises foveal 308 and peripheral 306 vision regions, correspond to the base of a 25 degrees-wide cone in the coordinate space of the virtual scene.

Objects 406A and partial objects 406B in FIG. 4C that do not fall within visible section 310 are not displayed on the retina and, thus remain invisible to the eye until being recalled from computer memory (or derived from stored information) and included within SoE 304 by the image projector that renders the recalled objects onto the retina, in response to the user turning their eye in the direction of those objects. In short, moving the eye and SoE 304 to look around a virtual image or scene bears resemblance to scanning a surface in the dark by illuminating the surface with a flashlight. Accordingly, the image projector effectively updates the SoE 304 relative to eye movements of a user by loading a corresponding portion of the virtual image and updating what is projected onto the eye.

It is noted that while images rendered onto the retina are depicted as being circular in FIGS. 4A-4C, this is not intended as a limitation on the scope of the present disclosure, since any shapes, such as ellipsoids, rectangles, hexagons, or any arbitrary shapes, may equally be used.

Unlike an actual flashlight that allows eyes to inspect (i.e., move toward or look at) any part of the illuminated area, including objects that are located at or near the edges of the illuminated area, the concept of the SoE does not allow the wearer of an EMD to inspect or move the eye to directly look at the edge of visible section 310 to view off-center regions 306 of visible section 310 that are projected outside of foveal vision region 308. In embodiments, in response to detecting an attempt to inspect an object or image that is displayed at the edge of visible section 310, a displayed object may be re-rendered, such as to move from the edge, the users' peripheral vision region 306, to the user's foveal vision region 308 to enable the user to inspect objects anywhere in a virtual scene, including objects originally located outside of foveal vision region 308. Said another way, movement of the eye corresponds to movement of the flashlight.

E. Partitioning of Virtual Scene

Figure 5A:
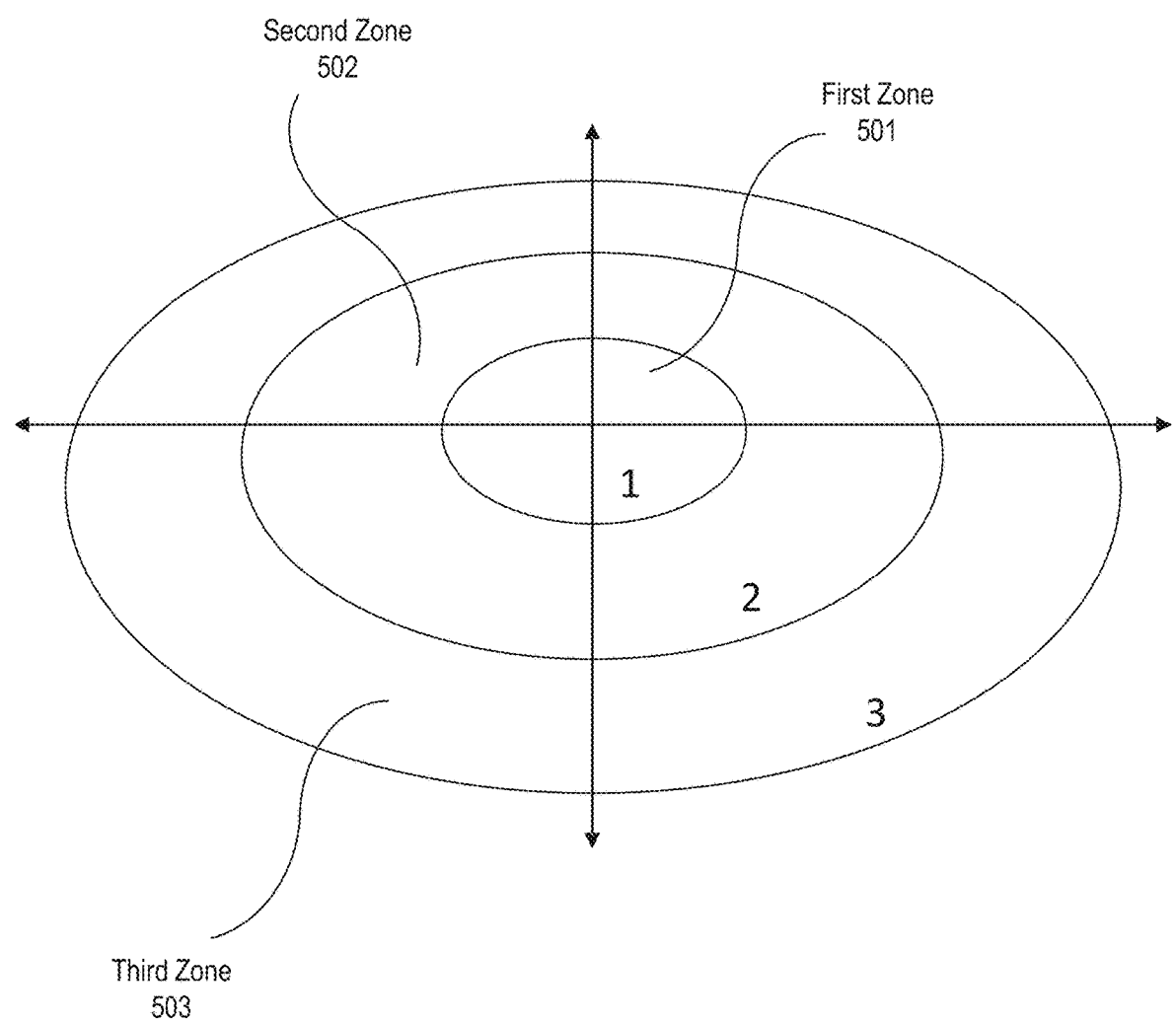
FIG. 5A illustrates a partitioned virtual scene into a plurality of zones according to various embodiments of the disclosure.

FIG. 5A illustrates an exemplary partitioning structure in which zones are identified to organize where virtual objects (including virtual tools, virtual peek windows and virtual detailed windows) are displayed within the virtual scene. It is important to note that this description of the partitioning of a virtual environment into zones is provided to explain certain concepts relevant to the invention and is not needed in many implementations of the inventions. In this particular description, the zones are in a head-fixed coordinate system since they relate to eye movements with respect to the head. FIG. 5A shows a virtual environment that is partitioned into three zones. A first zone 501 is located proximate to the center of the virtual environment, a second zone 502 is located beyond the first zone 501, and a third zone 530 is located at the periphery of the user's field of view. The third zone 530 defines a virtual area proximate to the periphery of a user where it is difficult for a user to maintain an eye-focused position in this zone for an extended period of time. Activation of the user interface within the virtual environment may be initiated by a user's eye-movement to a particular location(s) within this third zone 530 for a particular period of time. Because it is uncommon for a user to maintain focus in this zone 530, a user is less likely to inadvertently activate the interface or virtual tools during use of the EMD 102. Stated another way, a user's intent to activate the interface and/or one or more virtual tools is more accurately identified by positioning the activation mechanism within an area of the virtual environment that is not commonly looked at during normal operation of the EMD and/or less comfortable for a user to maintain focus.

In comparison, the first zone 501 is much easier for a user to focus on for an extended period of time relative to the third zone 530. This first area 510 provides a space in the virtual environment where a user can comfortably review large amounts of information or otherwise interact with virtual objects for a longer period of time. Control of virtual objects within this first zone 501 by a user's eye-movement may also be more sensitive due to the user's ability to control eye-movement more precisely within this zone. Thus, more nuanced virtual objects may be placed within this first zone 501 that allow user interaction with smaller eye movements. As will be discussed in more detail below, virtual objects such a detailed text windows, dynamic control of electronics within the user's geographical space, detailed calendars, books, web browsing and other virtual objects known to one of skill in the art.

In certain embodiments, the second zone 502 may function as a transition zone where summary information or basic control related to an activated tool is provided to the user. Virtual objects within this second zone 502 may provide a user a summary of content or simple controller that bridges an activated virtual tool to a detailed virtual window subsequently displayed in the first zone 501. For example, a peek window, described in more detail below, may appear in this second zone 502 after a virtual tool is selected. This peek window may provide summary information or basic control of content associated with the virtual tool. If a user wants more information or control of this content, then the user may initiate a transition to a detailed window within the first zone 501 that corresponds to this peek window. This organized structure of virtual objects within a virtual environment aligns itself to the natural eye-movements of the user and facilitates a relatively more accurate virtualized eye-movement control framework compared to prior art systems. One skilled in the art will recognize that the partitioning of the virtual environment may be adjusted across different users based on each user's visual characteristics such as field of view, saccadic movements, etc.

F. Eye-Tracking User Interface

Figure 5B:
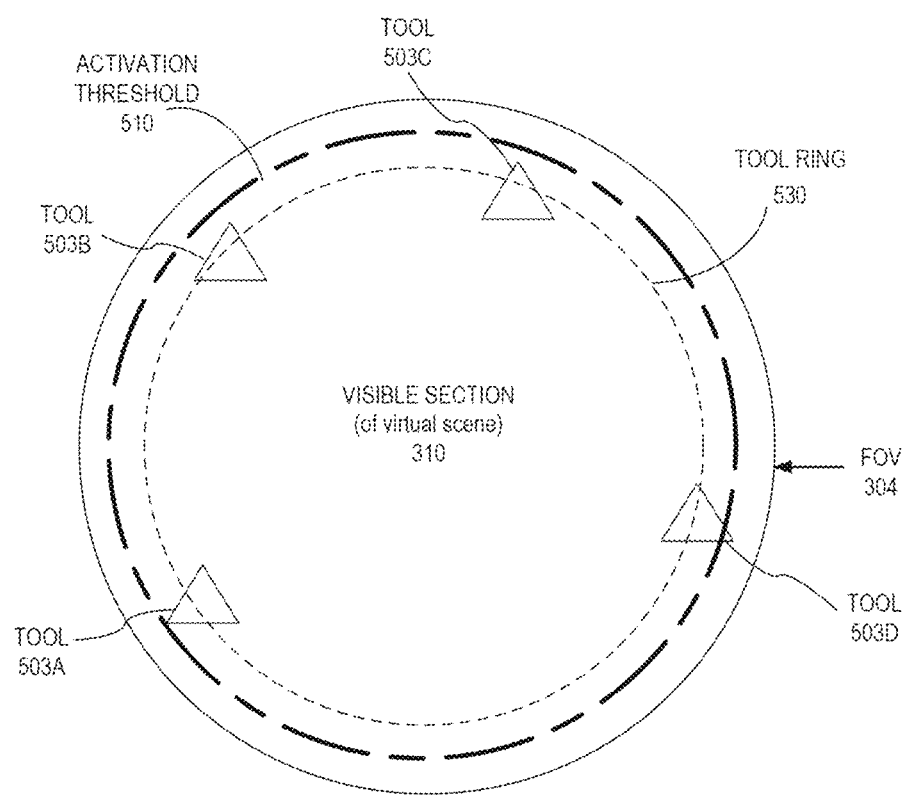
FIG. 5B illustrates an exemplary virtual tool ring relative to a range of eye motion of a user within a virtual scene according to various embodiments of the disclosure.

FIG. 5B illustrates one example of the virtualized eye-movement control framework according to various embodiments of the disclosure. An activation threshold 510 is provided near the edge of the user's eye's range of motion 304 and is allows a user to activate a virtual user interface to interact with various virtual objects. The shape of this threshold 510 may vary across various embodiments and may be symmetrical, asymmetrical, jointed, disjointed or take any shape that fits within the virtual environment. In certain embodiments, the shape of the threshold 510 may be bean shaped so as to correlate with the user's natural eye range of motion. For simplicity, FIG. 5B illustrates this threshold 510 as a ring proximate to the edge of the user's eye range of motion 505. For example, the threshold 510 may be placed within zone three 503, at the border between zone three 503 and zone two 502, or a combination thereof. In certain embodiments, the threshold 510 is positioned at a preferred distance from the edge of the eye range of motion 505 which is defined after a calibration procedure is performed that identifies the user's specific field of view. To define the user's range of motion in certain embodiments, the EMD 102 will have a user look in a variety of directions to his/her farthest extent and track these eye movements to construct a model. After the range of motion 505 is defined, the activation threshold 510 is placed within a virtual scene at a point sufficiently close to the edge of the range of motion such that user's intent to activate interface may be reliably predicted. It is important that the activation threshold 510 is positioned sufficiently close to the edge of the range of motion 505 where the user's eye position is commonly located to minimize erroneous activation of the interface. In certain embodiments, the threshold 510 functions as a threshold and not shown within the virtual environment when in a deactivated/dismissed state. In other embodiments, the threshold 510 is visible when in a deactivated/dismissed state to visually guide a user to the activation threshold. An activation movement is defined as a user's eye movement that crosses the activation threshold. This activation movement may constitute one or multiple eye movements. The system may also consider saccaded eye movement to the periphery in determining whether an activation threshold is crossed. In other embodiments, a time threshold is applied after the user's eye movement crosses the activation threshold such that the user must maintain an eye position beyond the activation threshold for a predetermined period of time.

Systems may track eye movement towards the periphery in various ways dependent on the AR/VR system being used. In EMD systems, eye motion is tracked by inertial sensors mounted in a contact lens as described in more detail within the specification. The inertia sensors may operate independently and exclusively to track eye motion to the periphery or may leverage an auxiliary device, such as a headband, that tracks head movement. If this head mounted auxiliary is employed, then the system may track eye movement to the periphery by combining the measured eye movement using the inertial sensors and the measured head movement using the auxiliary device.

In the case of using the inertial sensors, eye motion is tracked in a world-fixed (reference vectors: magnetic north, gravity down) frame of reference. Eye motion toward the periphery of the eye socket may be difficult to track directly, but it can be inferred by leveraging a user's eye movement characteristics that suggest such movement. For example, it can be inferred by keeping track of the history of eye angle over short periods of time. Most of the time people keep their eyes roughly centered in their eye sockets. An activation and tool selection instructions to a user might be leveraged to define user patterns and movement ranges. For example, the system may instruct a user to "Look straight ahead" and the to "look toward the periphery" while the system monitors these movements. This specific motion can be stored and used to identify when eye movement is towards the periphery.

If the auxiliary device is used, then head motion is tracked directly by sensors in the body of the head-mounted display. The eye motion is tracked by small cameras in the head-mounted display that are aimed at the eyeballs. These cameras may be located with virtual reality or augmented reality goggles or glasses. In these types of systems, eye motion is tracked in a head-fixed frame of reference such that eye motion toward the periphery of the eye socket is tracked directly. As a result, these types of head-mounted and camera-based do not need to infer anything.

After the interface is activated, a set of virtual tools are displayed along a path that creates an outline of an inner area 310 and outer area within the virtual scene. This activation of the set of virtual tools may occur immediately after the interface is activated. As such, the activation of the interface and the display of the virtual tools may appear to a user as being simultaneous events. The inner area 310 may relate to a closed area or an open area depending on the shape of the threshold. In various embodiments, the virtual tools 550A-550E are positioned within the activation threshold 510. Once again, the shape of this outline on which virtual tools 550A-550E are positioned may vary across embodiments and may be symmetrical, asymmetrical, jointed, disjointed or take any shape that fits within the virtual environment. The shape of the outline 530 may also be bean shaped, circular, oval, rectangular, an arc, a line of tools, etc. For simplicity, FIG. 5B illustrates this outline 530 as a ring within the interior of the activation threshold 505. In certain embodiments, the ring 530 is not shown within the virtual scene and the virtual tools 550A-550E appear as discrete icons. In other embodiments, the ring 530 is visible and connects the virtual tools 550A-550E along its outline. The line may convey to the user that there are additional tools that fall outside of the span of eccentricity of the visible projection. The line may also guide the user's glance toward other available tools. One skilled in the art will recognize that in certain embodiments where the span of eccentricity limits the user's ability to see all the available tools, the line will aid the user in understanding where certain tools are located within the virtual environment or further organize the tools within the virtual scene.

The virtual tools 550A-550E represent content, functionality, controls, menus or other things that may be viewed or manipulated within the virtual scene. Examples of these tools may include textual icons, time/date symbols, device controls, menu symbols, or other icons representative of virtual content. In certain embodiments, an eye-tracker monitors the user's eyes within the virtual scene to determine when the user glances at or proximate to the tools in order to select a particular tool. This glance may take into account a variety of factors in determining whether to select the tool including the period of time the glance focuses at or proximate to the tool, head movement (or lack thereof) associated with the glance, saccadic characteristics of the eye movement of the glance, the eye distance traveled by the glance and other eye movements that may indicate an intent to activate a particular tool.

After a tool is selected by the user, content or functionality is provided to the user within the interior area 310 in an organized manner such that the user may interact with the system to access content and/or control at a variety of granularities. In certain embodiments, selected tools and/or windows are locked in the virtual space relative to the user's head, body or physical environment to allow the user to interact with it more efficiently. This organization of content is aligned to the way in which an individual visually interacts with his/her environment. Detailed content or nuanced virtual control is positioned near the center of the user's field of view while summary information is located at a distance proximate to the center. This organization provides a preferred virtual interface that is more comfortable and which reduces errors when this interaction is controlled by tracking the eye movements of the user.

Figure 6A:
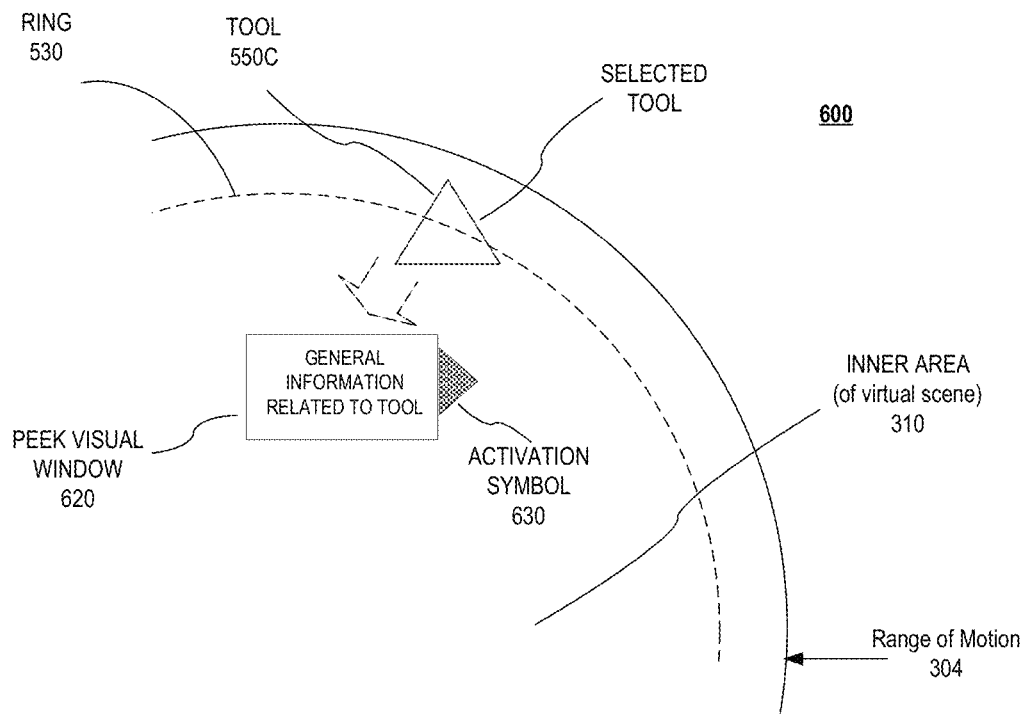
FIG. 6A illustrates a user-selected virtual tool that generates a peek window within an inner area of the tool ring according to embodiments of the present disclosure.

FIG. 6A illustrates an example of a peek window being displayed in response to a virtual tool being selected according to various embodiments. A virtual tool 550C positioned on the tool ring 530 is selected by a user. In response, a peek window 620 is displayed within the inner area 310 and provides general information related to the selected tool 550C. In certain embodiments, this peek window 620 may provide basic summary information related to the tool 550C or may provide a basic control mechanism that allows the user to interact with another virtual device or device external to the virtual environment. The peek window 620 may be positioned within the virtual scene at a location closer to the center point relative to the virtual tool 550C. For example, the peek window 620 may be positioned in a location related to zone two 502 in the previous discussion. This positioning allows the user to interact more comfortably using eye-moving with the peek window 620 than the virtual tool 550C, but still not be in an ideal center zone (e.g., zone three 503).

The user may dismiss the peek window 620 by looking away from the window for a predetermined period of time. The system may identify when a user looks away from the window by measuring the angle of a glance relative to the window. If this glance angle goes beyond a threshold for a predetermined amount of time, then a reasonable inference of the user's intent to dismiss the window may be inferred. The dismissal of the peek window 620 results in the window disappearing from the virtual scene. Another method of dismissal: some tools are immersive, meaning they cover all or a substantial portion of the sphere around the user's head and body. In these cases, there may not be a clear or easy to reach place to look away from the displayed virtual content. An alternate approach to dismissing it is to repeat the activation gesture (e.g. hold head steady and look to the periphery of the range of motion again)

If the user wants more information, one or more activation symbols 630 are provided proximate to the peek window 620 that allows a user to select and initiate a second window that displays more detailed information or provides more complex control related to the peeks window 620. Although this activation symbol 630 is shown as a triangle adjacent to the peek window 620, one skilled in the art will recognize that this symbol 630 may be of any form and located in any position proximate to the window 620.

Figure 6B:
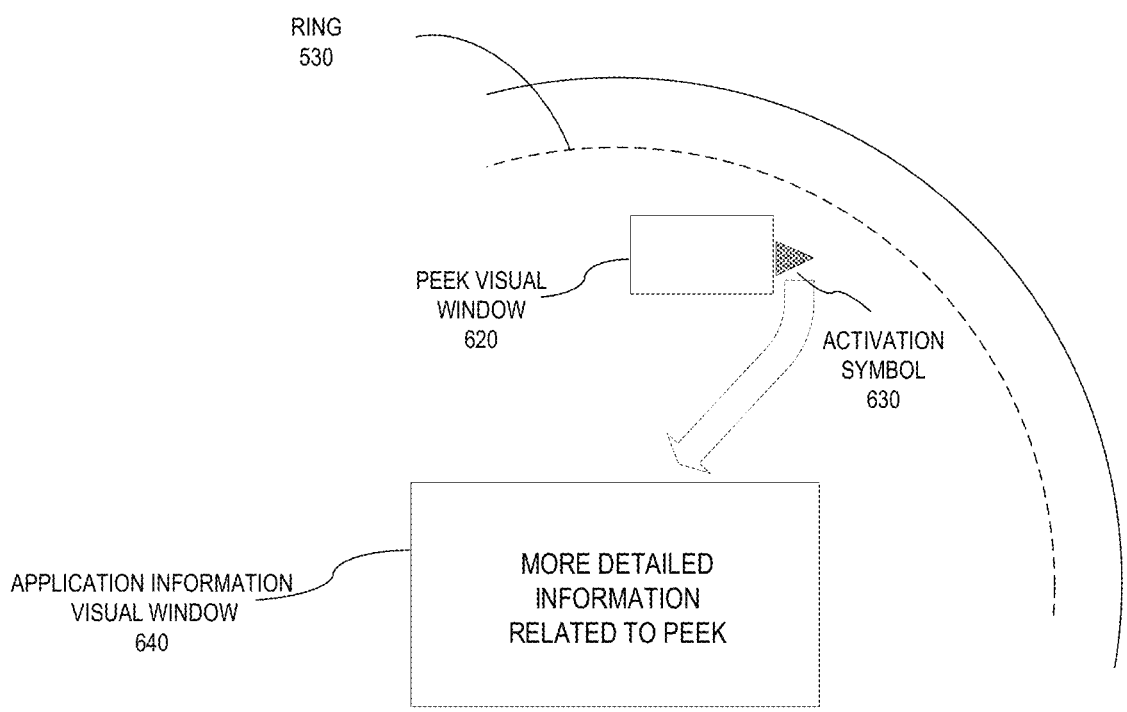
FIG. 6B illustrates a user-selected virtual window related to the peek window according to embodiments of the present disclosure.

FIG. 6B illustrates an activated virtual window in accordance with various embodiments of the disclosure. The activated virtual window 640 may provide more detailed information, larger amount of text, more complex control, or any other content related to the peek window 620. Further, the virtual window 640 is positioned nearer to the center of the virtual environment (i.e., within zone three 501) to allow the user the most comfortable eye and head position to interact with the virtual window 640 in certain embodiments.

The user may dismiss the virtual window 640 by looking away from the window for a predetermined period of time. The dismissal of the virtual window 640 results in the window disappearing from the virtual scene and possibly the system entering a standby or sleep state.

One skilled in the art will recognize that various embodiments of the invention align a virtual object's level of information and/or level of interactivity to the position in which it is displayed in the virtual environment. In these examples, the position of the virtual object's cascade toward the center of the virtual environment as the level of information and/or interaction increases. A few examples are provided below to illustrate this organizational approach as well to show the wide variety of content and functionality that may be provided a user in accordance with the many embodiments of the invention.

Figure 7A:
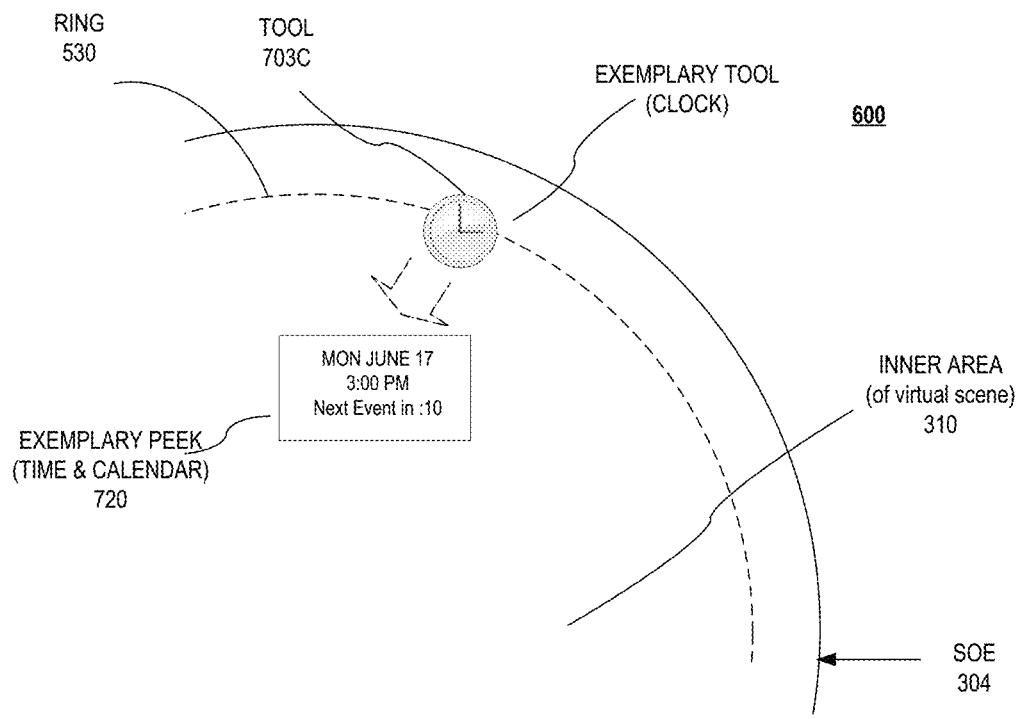
FIG. 7A illustrates an exemplary user-selected virtual clock tool that generates a time & calendar peek window within an inner area of the tool ring according to embodiments of the present disclosure.
Figure 7B:
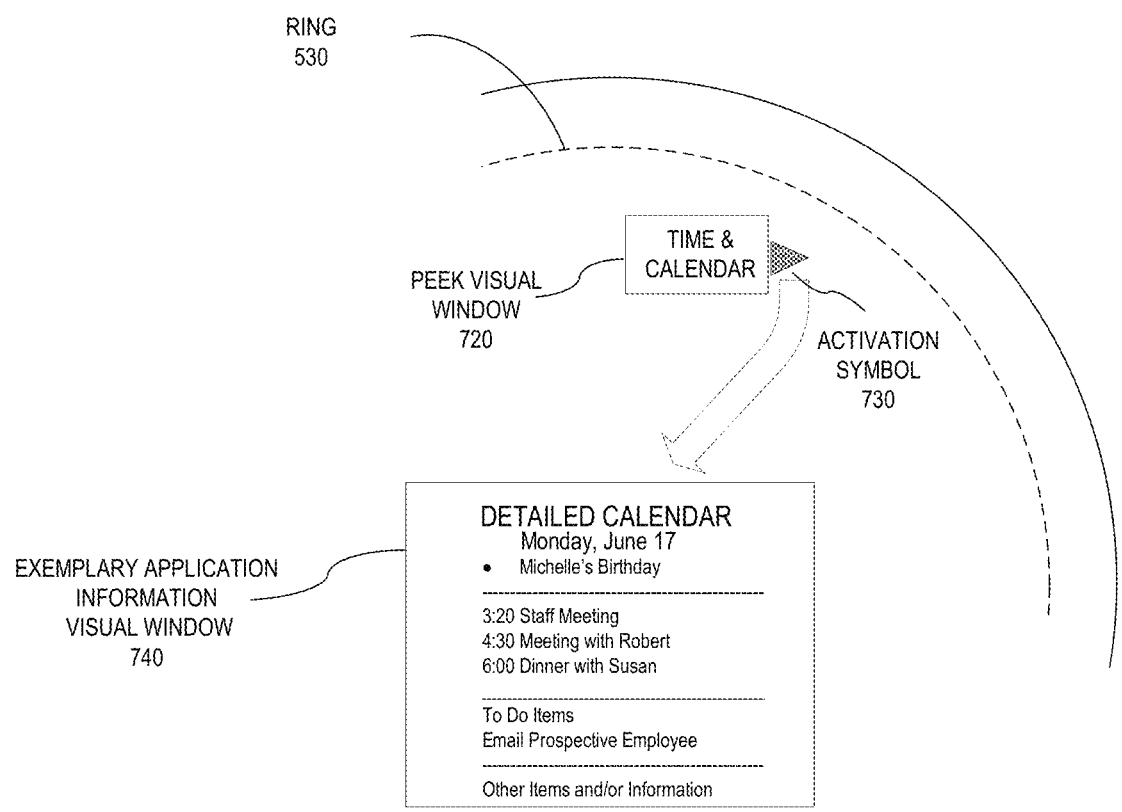
FIG. 7B illustrates an exemplary calendar related to the time & peek window according to various embodiments of the present disclosure.
Figure 7B:
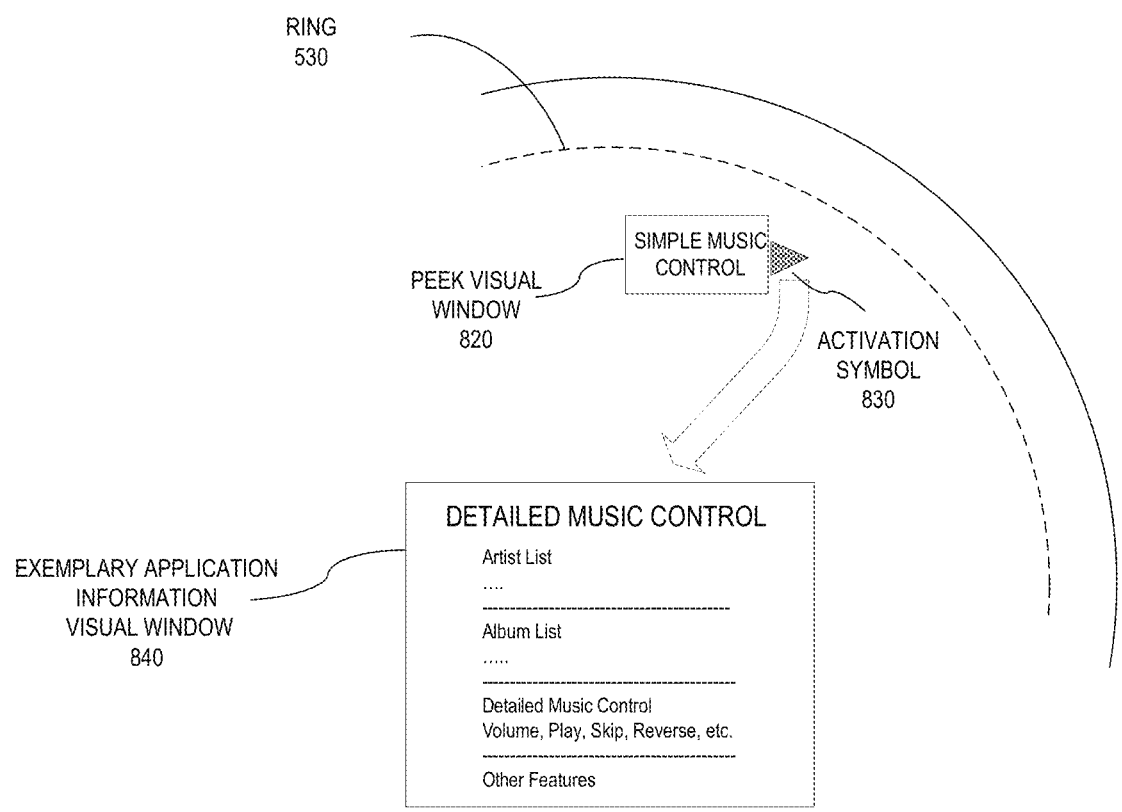

FIGS. 7A and 7B illustrate an example in which time, date and calendar information are provided to a user in a virtual environment according to various embodiments of the invention. In this example, a clock icon 703C is shown as a virtual tool on the ring 530 after activation. After a user selects the clock icon 703C by looking at the icon or beyond the icon, a peek window 720 is displayed within the inner area 310 of the virtual scene. The peek window 720 displays the current time and date and summary information about the user's calendar. After the user triggers the activation symbol 730 by focusing on the activation symbol 730 for a period of time, a virtual window 740 is displayed that provides detailed information from the user's personal calendar. This virtual window 740 is displayed at or near the center of the virtual scene.

Figure 8A:
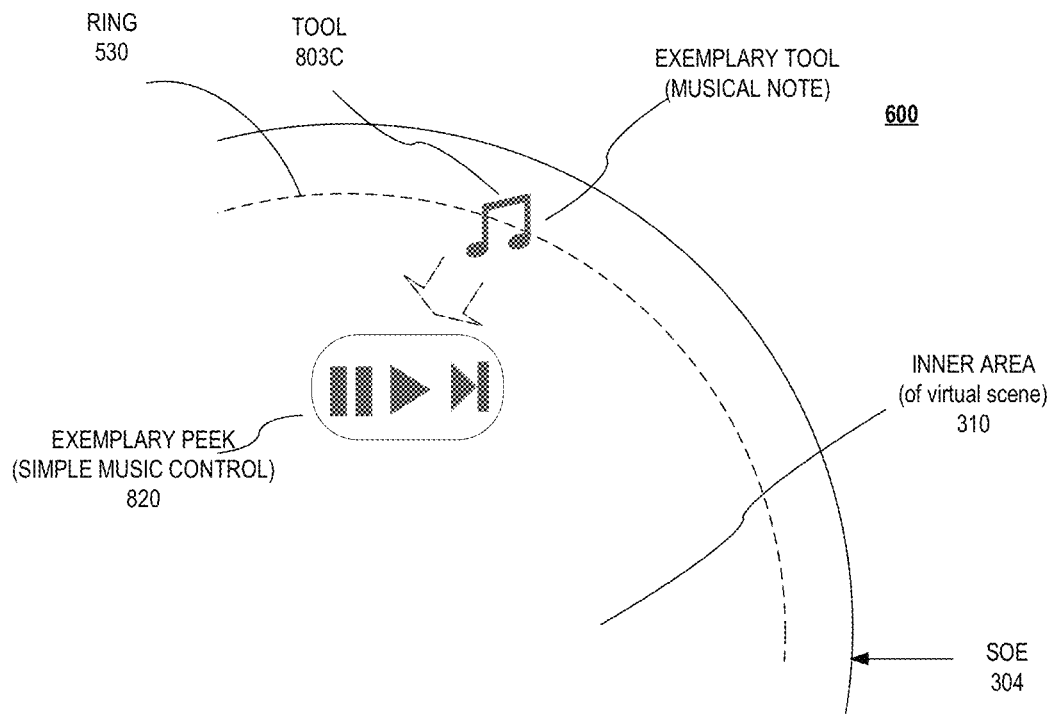
FIG. 8A illustrates an exemplary user-selected virtual music tool that generates a simple music control within an inner area of the tool ring according to embodiments of the present disclosure.
Figure 8B:
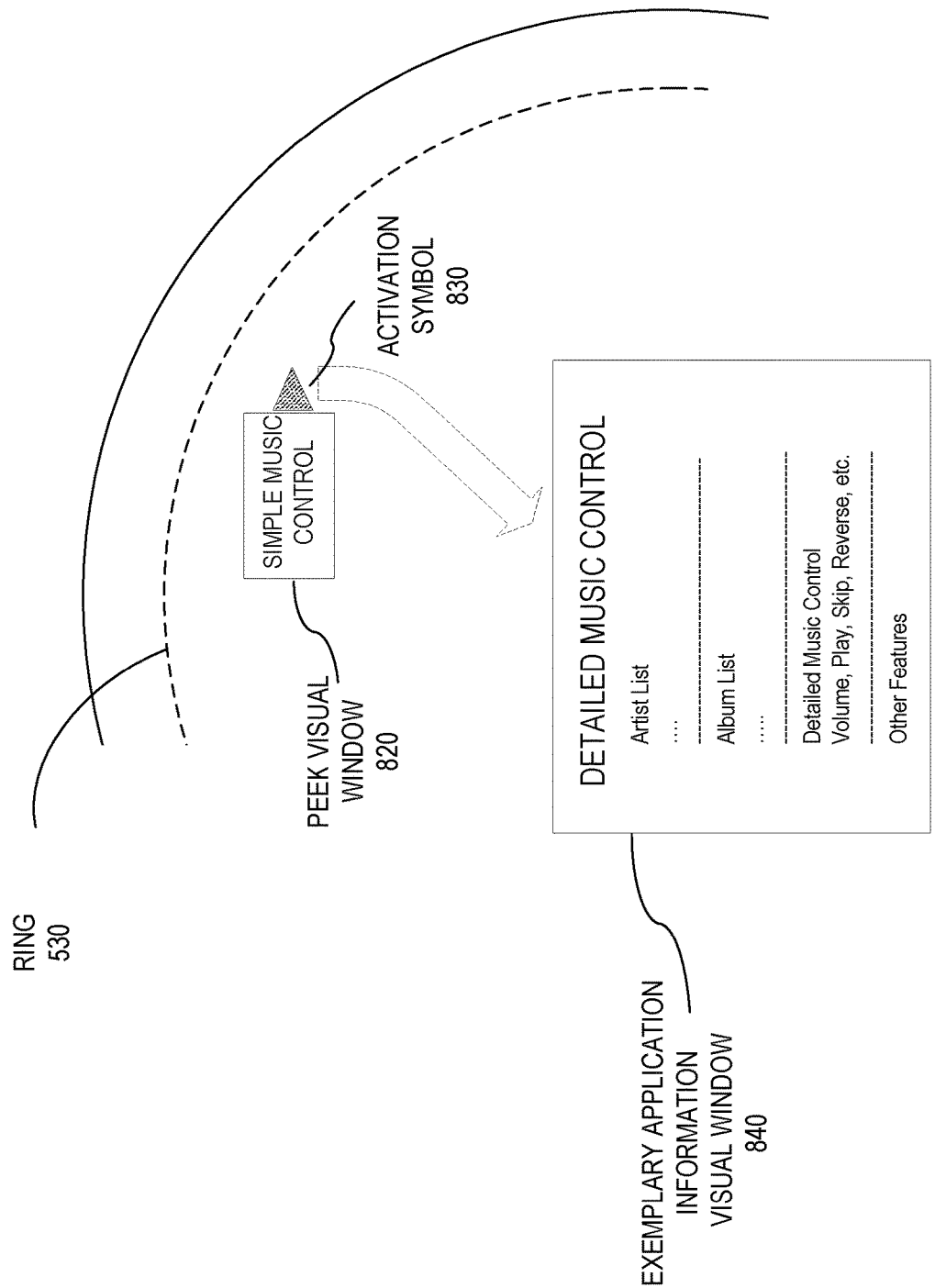
FIG. 8B illustrates a detailed music control related to the simple music control according to various embodiments of the present disclosure.

FIGS. 8A and 8B illustrate an example in which music controllers are provided to a user in a virtual environment according to various embodiments of the invention. In this example, a music icon 803C is shown as a virtual tool on the ring 530 after activation. After a user selects the music icon 803C by looking at the icon or beyond the icon, a peek window 820 is displayed within the inner area 310 of the virtual scene. The peek window 820 displays a basic music controller that provides basic control to allow a user to play, pause or skip songs being played on a musical device. After the user triggers the activation symbol 830 by focusing on the activation symbol 730 for a period of time, a virtual window 840 is displayed a more dynamic music controller that provides the user an ability to control a variety of functions of a musical device. This virtual window 940 is displayed at or near the center of the virtual scene.

Figure 9A:
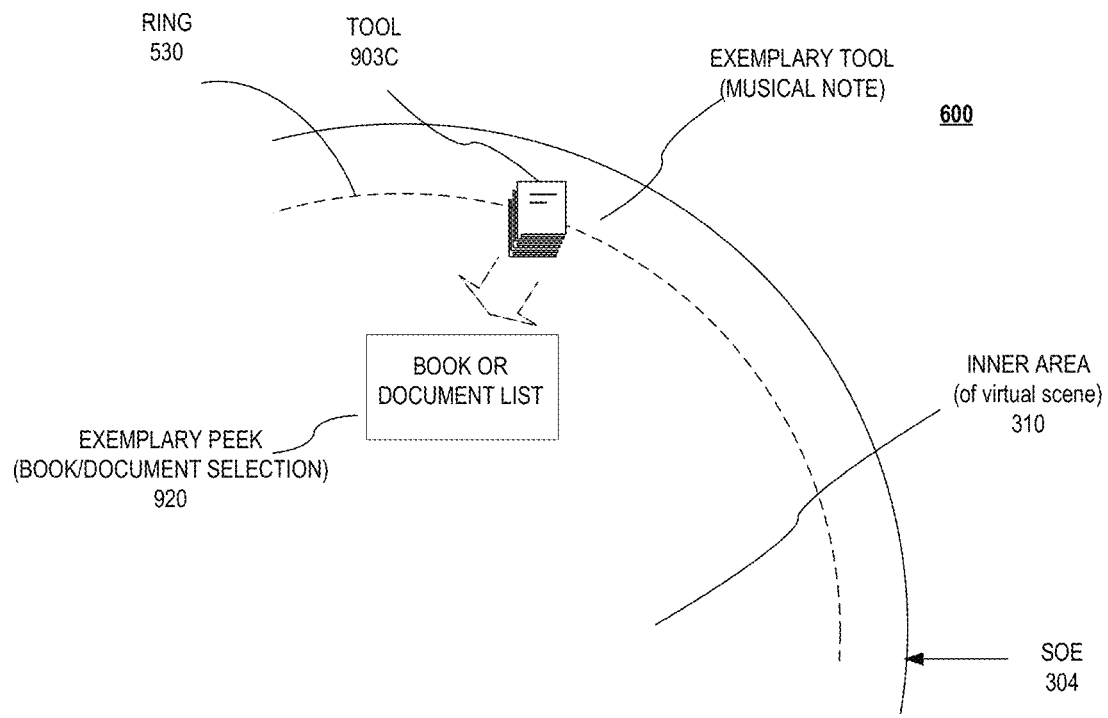
FIG. 9A illustrates an exemplary user-selected virtual text tool that generates a simple book/document list within an inner area of the tool ring according to embodiments of the present disclosure.
Figure 9B:
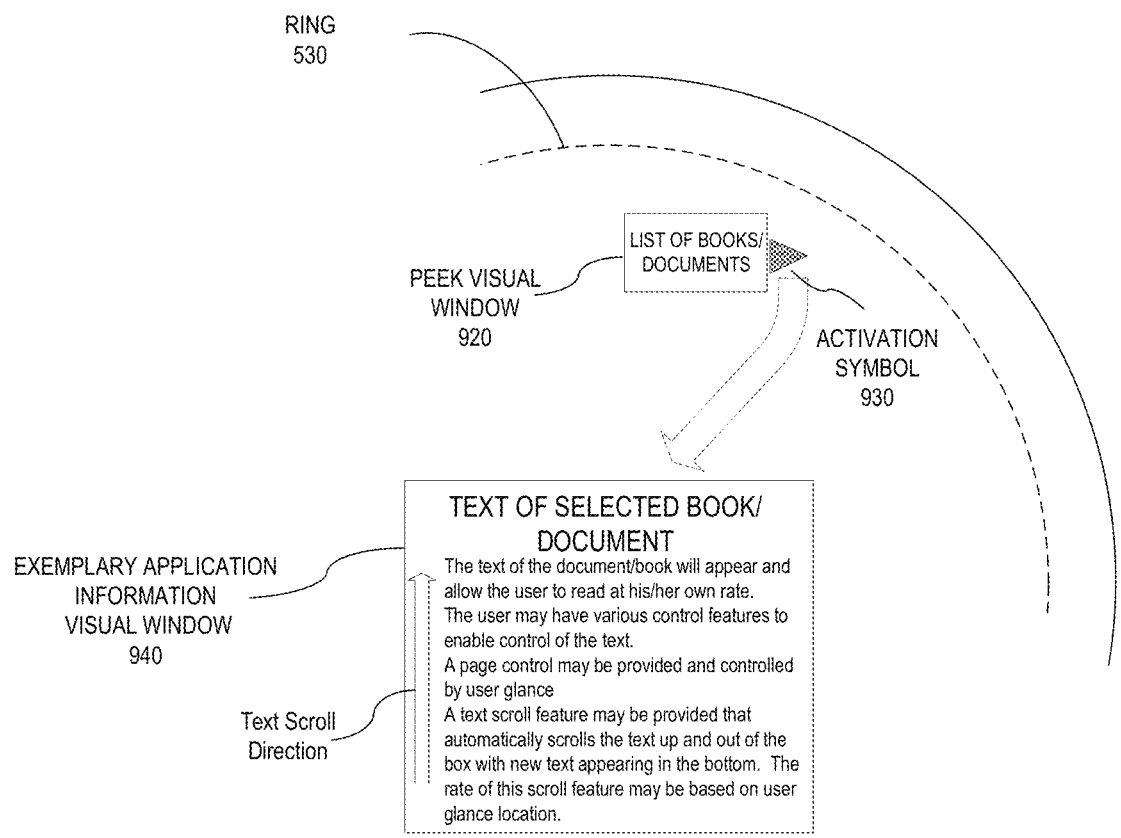
FIG. 9B illustrates and exemplary virtual text window that provides a user a document or text according to embodiments of the present disclosure.

FIGS. 9A and 9B illustrate an example in which text is provided to a user in a summary format or a complete format according to various embodiments of the invention. In this example, a text icon 903C is shown as a virtual tool on the ring 530 after activation. After a user selects the text icon 903C by looking at the icon or beyond the icon, a peek window 920 is displayed within the inner area 310 of the virtual scene. The peek window 920 displays a list of books, texts, or summary of texts that allows a user to select a topic. After the user triggers the activation symbol 930 by focusing on the activation symbol 930 for a period of time, a virtual window 940 is displayed in which more detailed text is provided to the user. The user's eye position is monitored as the text is read so that text is scrolled within the window 940. Other control features may be included in the virtual window 940 to allow the user to skip through the text. This virtual window 940 is displayed at or near the center of the virtual scene.

G. Eye-Tracking User Interface Manager

Figure 10:
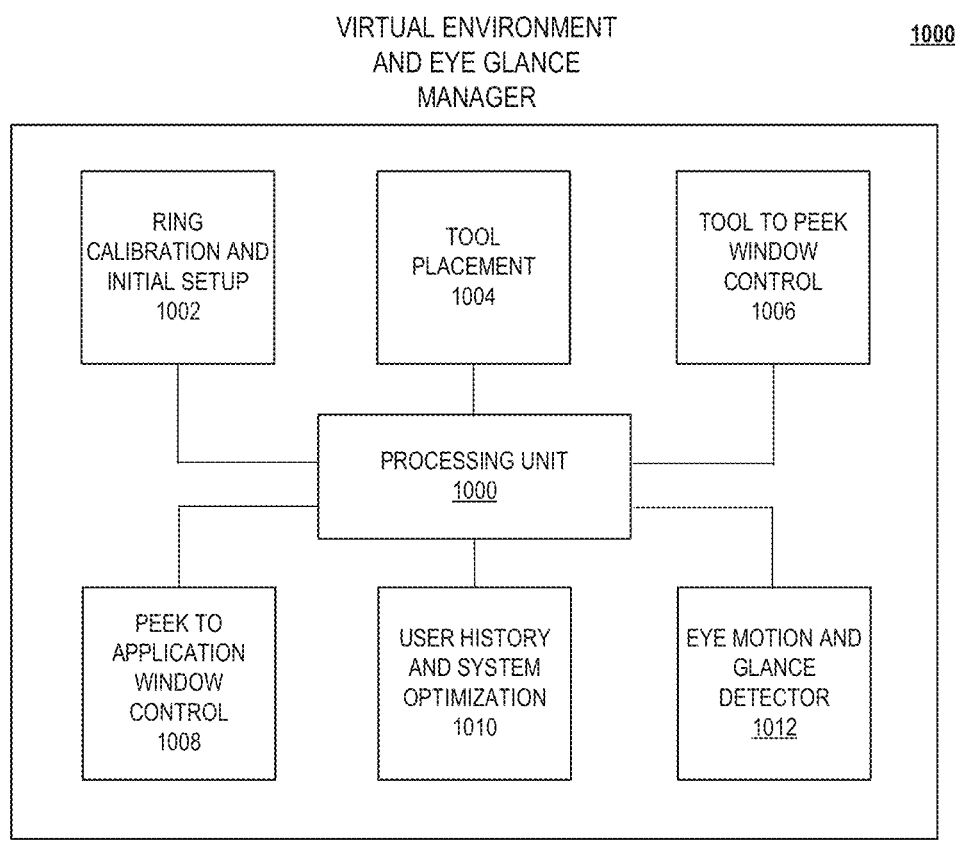
FIG. 10 illustrates an eye-tracking user interface manager according to various embodiments of the present disclosure.

FIG. 10 illustrates an eye-tracking user interface manager in accordance with various embodiments of the disclosure. The manager 1000 may be implemented as hardware, software, firmware or a combination thereof. The manager 1000 may be implemented in an EMD, an auxiliary device that interfaces with the EMD, a cloud device that interfaces with the EMD, or any other device that controls various eye-tracking features that enable a user to activate, select and dismiss virtual objects within a virtual scene.

The manager 1000 comprises a processing unit 1020 that interfaces with various sensors and components. A ring calibration and initial setup module 1002 initializes the ring and defines a location of the ring within the virtual scene. This module 1002 may define this location of the ring by identifying a user's field of view via a series of eye monitoring tests that define the edges of the field of view. A tool placement module 1004 places the plurality of virtual of tools along the ring. This placement of tools may depend on the frequency that a user selects one or more tools and placing those tools in locations that most accurately identify a user's intent to select tools. An eye motion and glance detector 1012 receives eye-movement data from sensors and translates this data into references frames correlated to the virtual scene. Using this functionality, the system can track eye movement relative to virtual objects within the virtual scene.

A tool-to-peek window control 1006 manages the transition from a selected virtual tool to a peak window in accordance with the above-described methods. A peek-to-virtual window control 1008 controls the transition from a selected activation symbol to a virtual window in accordance with the above-described methods.

The manager 1000 may also contain a user history and system optimizer 1010 to adjust various parameters or characteristics of the user interface based on an analysis of how the user interacts with the virtual objects. This optimizer 1010 may records errors generated during the use of the user interface and adjust parameters to improve the accuracy of a user activating, selecting or dismissing virtual objects within the virtual scene.

What is claimed is:

1. A method of activating a virtual user interface, the method comprising:
    defining a virtual threshold based on a calibration process that performs a plurality of eye movement measurements, the virtual threshold being proximate to a periphery of the user field of view;
    measuring an angle associated with a user eye movement in relation to the virtual threshold;
    associating a user head movement with the measured angle of the user eye movement;
    determining if the user eye movement crosses the virtual threshold based on the measured angle of the user eye movement and the associated user head movement; and
    making the virtual user interface appear to the user if the user eye movement crossed the virtual threshold for a period of time.

2. The method of claim 1 wherein the user eye movement is a saccade.

3. The method of claim 1 further comprising the step of defining a minimum head movement threshold and making the virtual user interface appear to the user only if the associated user head movement is below the minimum head movement threshold.

4. The method of claim 1 wherein the plurality of eye movement measurements during the calibration process relates to the user field of view.

5. The method of claim 1 wherein the user head movement is measured directly by a sensor located on the user head.

6. The method of claim 1 wherein the user head movement is inferred based on the measured angle of the user eye movement.

7. The method of claim 1 wherein the angle of the user eye movement is measured by at least one sensor on a contact lens.

8. A method of dismissing at least one virtual object within a virtual scene, the method comprising:
    displaying the at least one virtual object within the virtual scene;
    measuring an angle of a user eye movement in relation to the at least one virtual object;
    associating a user head movement with the measured angle of the user eye movement; and
    dismissing the at least one virtual tool if a user glances away from at least one virtual object based on the angle of the user eye movement exceeding a first threshold for a first period of time and the associated user head movement is below a minimum head movement threshold.

9. The method of claim 8 wherein the user head movement is measured directly by a sensor located on the user head.

10. The method of claim 8 wherein the user head movement is inferred based on the measured angle and distance of the user eye movement.

11. The method of claim 8 wherein the angle and distance of the user eye movement is measured by at least one sensor on a contact lens.

12. A method for creating an interactive virtual scene, the method comprising:
    defining a shape within a virtual scene, the shape having an outline on which a plurality of virtual tools is displayed, the shape outline defining a virtual boundary separating an inner area and an outer area within the virtual scene;
    tracking user eye movement with at least one sensor on a contact lens, the user eye movement relating to user interactions with the virtual scene;
    activating a first tool within the plurality of tools in response to the user performing a first activation movement, the first activation movement including a first eye movement associated with a first intent to activate the first tool;
    displaying a first virtual window within the inner area in response to activating the first tool, the first virtual window providing the user a first information set associated with the first tool;

displaying a second virtual window within the inner area in response to a user performing a second activation movement, the second activation movement including a second eye movement associated with a second intent to activate the second virtual window, the second virtual window providing a second information set related to the first information set; and dismissing at least one of the first virtual window and the second virtual window based at least in part on a third eye movement associated with an intent to dismiss at least one of the first virtual window or the second virtual window, the third eye movement comprises a user looking away from the first virtual window or the second virtual window for a predetermined period of time;

wherein each virtual tool within the plurality of virtual tools is visually coupled by a virtual line on the shape outline; and wherein the virtual line provides the user a guide to a subset of virtual tools within the plurality of virtual tools, the subset of virtual tools being located outside of a visible, span of eccentricity of the projected image and virtually mapped to the shape outline within the virtual scene.

* * * * *